April 28, 1970 | M. E. GORDON | 3,509,541

PROGRAM TESTING SYSTEM

Filed April 4, 1967 | 4 Sheets-Sheet 1

INVENTOR
M. E. GORDON
BY Howard R Popper
ATTORNEY

April 28, 1970 M. E. GORDON 3,509,541

PROGRAM TESTING SYSTEM

Filed April 4, 1967 4 Sheets-Sheet 2

April 28, 1970 M. E. GORDON 3,509,541

PROGRAM TESTING SYSTEM

Filed April 4, 1967 4 Sheets-Sheet 4

United States Patent Office 3,509,541
Patented Apr. 28, 1970

3,509,541

PROGRAM TESTING SYSTEM

Mary E. Gordon, Nagoya, Japan, assignor to Bell Telephone Laboratories, Incorporated, Murray Hill and Berkeley Heights, N.J., a corporation of New York Filed Apr. 4, 1967, Ser. No. 628,327
Int. Cl. G06f *1/00*
U.S. Cl. 340—172.5 4 Claims

ABSTRACT OF THE DISCLOSURE

A stored program controlled data processing system is disclosed having a writeable prog-am store together with an interrupt mechanism selectively operated by the appearance of flag bits in certain instructions, particularly register load and memory storing instructions. During interrupt, certain types of program tests are performed to ascertain the utility of the flagged instruction.

This invention relates to stored program data processing systems and, more particularly, to arrangements for controlling the operation of such systems.

In processing programmed instructions it sometimes happens that a quantity is ordered to be entered into a register and then subsequently never used before a new quantity is overwritten in the register. It also happens sometimes that the quantity ordered to be entered in'o a particular register is already present in the same register. Similar occurrences take place with regard to memory storing instructions: it sometimes happens that information is ordered to be entered into a specified memory location and never read out. These problems are always attempted to be avoided by the programmer who initially writes the program. Because program languages generally afford the programmer a variety of options it is not, however, a simple task for the human programmer to eliminate these unnecessary and useless instructions. An example of why this is so will illuminate the point. In certain data processing machines, information is taken from memory and entered into a data buffer register by the same command which the programmer has employed to order the information entered into one of the index registers. The reason for this is to permit the data buffer to be employed as an index register or for the purpose of insertion masking. For the performance of insertion masking, the contents of the specified memory location replaces the contents of the data buffer register, and, after possible masking or complementing replaces the contents of the specified index register. Now even though the updated information has been entered into the specified index register it may not itself need to be read out but may merely be used by the program for the purpose of setting the sign and homogeneity flip-flops associated with that register. Under these circumstances, there will be no subsequent "read register" instruction. Accordingly, the mere failure to find a "read register" instruction following the "register load" instruction is not of itself sufficient to negate the utility of the prior register load instruction.

Another word may be said concerning the steps which might be taken by a programmer attempting to eliminate unnecessary instructions from the program which he has just written. The programmer at this stage will be working not with data but with symbolic representations of locations. Accordingly, the programmer must steel himself for the laborious task of tracing locations, transfers, and register references. The particular location in memory, say LøC A, from which information is ordered to be transferred to a particular register must be remembered until another order in the program is found which again orders information to be transferred from LøC A to the same register. All of the program instructions between these two orders must then be examined to determine whether the contents of LøC A or of the register have been changed by any of these instructions. If none of these instructions changes the contents of LøC A or of the register, the programmer may be justified in concluding that the first instruction to transfer the contents of LøC A to the particular register was unnecessary. However, if any of the intermediate instructions was an entry point from another program, the location from which this transfer is made must be examined for further references to LøC A and to the particular index register. As can readily be appreciated, the foregoing tasks are extremely tortuous.

If a programmer writes in a higher language such as Fortran, in which the individual machine instructions are automatically compiled from statements indicating the intent of a program, it is particularly hard to avoid creating some instructions which do not perform a useful function.

Accordingly, it is an object of the present invention to simplify the task of detecting useless or unnecessary unstructions in computer programs in order to reduce their length and running time.

It is another object of the present invention to relieve the programmer of the task of optimizing the sequence of source instructions.

It is another object of the present invention to regulate, in accordance with predetermined criteria, the storing of information in the register and memory areas of a stored program data processing system.

In accordance with one illustrative embodiment wherein instruction words are read from a program store into a register, which in a prior system is identified as a buffer order word register (BOWR), a plurality of register cells are added to the register at the output of the program store. A special decoder is associated with these cells to detect the presence of flag bits accompanying the appearance of an unexamined register or memory loading instruction in the buffer order word register. The presence of the flag bits causes the decoder to generate an interrupt signal which is entered into an interrupt source register together with an indication of the class and type of interrupt so occasioned. The processing of program instructions is halted by the interrupt source register after completing the instruction then in process of execution. The contents of the data buffer register is stored in memory to be replaced at the conclusion of the interrupt program. The address of the instruction which occasioned the interrupt is stored in memory at a location determined by the flag bits and transfer is made to the entry point of the interrupt program. The interrupt program determines (a) whether the information which would have been entered into the register specified in the instruction is employed in the program before being overwritten, (b) whether the information sought to be entered is the same as that already present in the register, and (c) whether, in the case of a memory store instruction, the program subsequently will call for the information. As a part of the method for determining the utility of the instruction, the interrupt routine determines whether the contents of any register which is loaded at the same time as the register explicitly specified in the instruction is susbsequently consulted by program.

Accordingly, it is a feature of the present invention to retain flags on register load and memory storing instructions until the utiliity of each instruction has been established in an interrupt routine which selectively tests the instructions and unsets the flag in accordance with the results of such tests.

It is another feature of the present invention that the interrupt routine selectively unsets the flag by examining instructions of the program to determine whether these instructions make use of the data attempted to be entered in the register by the flagged register load instruction.

It is another feature of the present invention that the execution of a flagged instruction taken from the program store be delayed by the interrupt program until the latter has unflagged the instruction after determining it to be useful.

It is another feature of the present invention that the illustrative interrupt program increment the program address register so that instructions which remain flagged after the tests performed during the interrupt routine may be omitted.

It is accordingly a basic objective to derive a program which can be recompiled and which will be faster and shorter because the programmer will know which steps can be skipped.

The foregoing and other objects and features may be more readily understood by referring now to the drawing in which.

GENERAL DESCRIPTION

Figure 1:
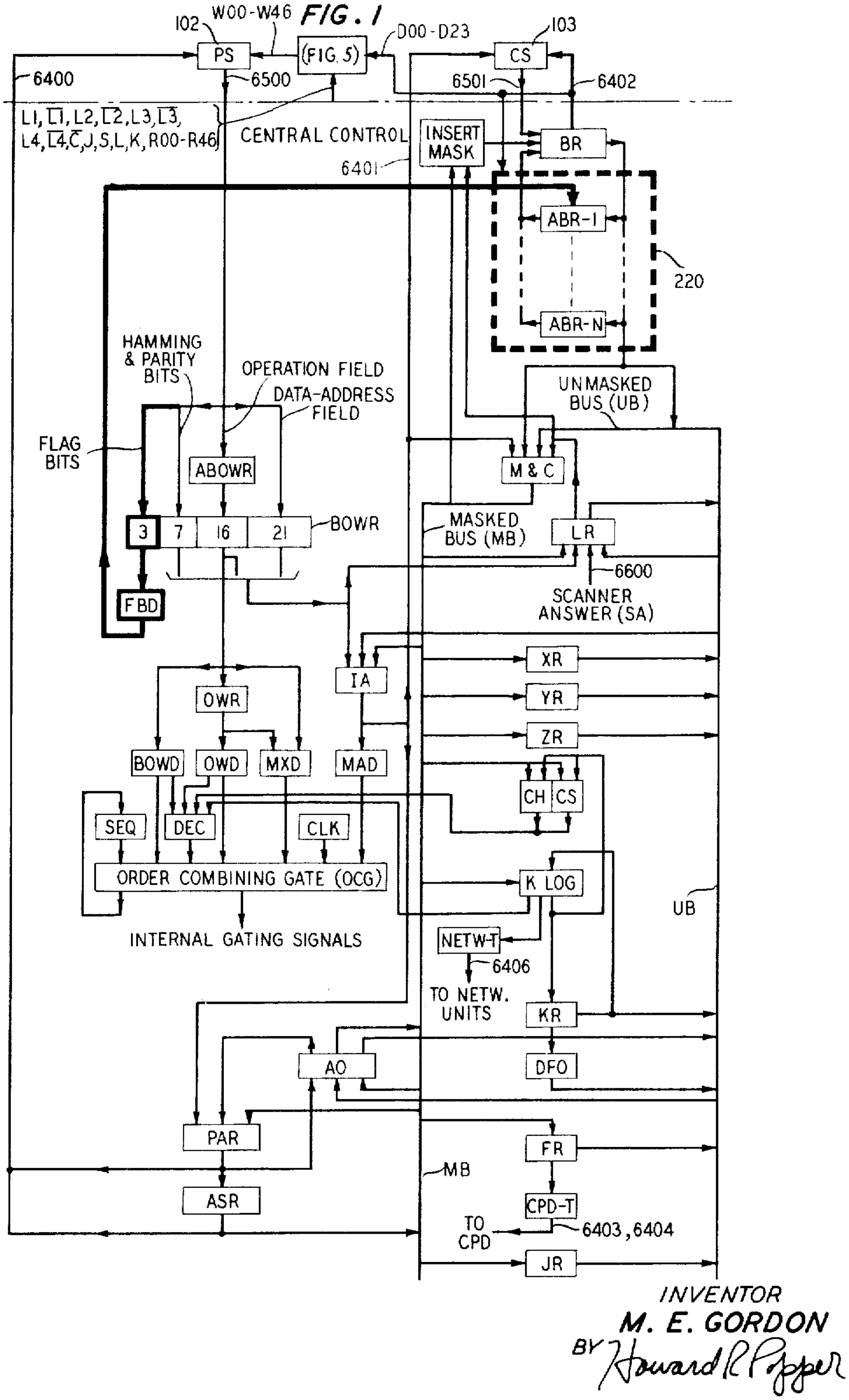
FIG. 1 shows an illustrative embodiment of a stored program data processing system modified according to the principles of the present invention.

The stored program data processing system shown in FIG. 1 is of the type described in the Bell System Technical Journal of September 1964. In FIG. 1 apparatus shown in light weight ink may be as described in the above noted Journal, particularly in the article at p. 1845, and that shown in heavy weight ink is provided, or modified, in accordance with the principles of the present invention. To facilitate the understanding of the present invention, the operation of the apparatus of FIG. 1 will briefly be described. Reference may also be made to Doblmaier et al. application Ser. No. 334,875, filed Dec. 31, 1963, and to J. A. Harr application Ser. No. 590,928, filed Oct. 31, 1966, for a further description of the type of data processing system to which my invention is applicable.

The data processing system comprises a program store 102 and a changeable temporary store or call store 103, both hereinafter from time to time generically being referred to as the memory. The address of an instruction in program store 102 is transmitted from the program address register PAR over bus 6400 to the program store. The address is generally incremented in each cycle of operation by the add one circuit AO in order to obtain successively numbered instructions. One of the sequencers in block SEQ interrupts the normal execution of orders and controls a transfer to a timetable program at the beginning of every five millisecond interval. Thereafter, since the address in the program address register PAR is continuously incremented, the instructions in the timetable program are executed in sequence.

Information contained in call store 103 is read by transmitting the address of the desired call store word over bus 6401. The selected word is read out on transmission bus 6501 and entered into data buffer register BR. To write a word into call store 103, the bits of the desired word are applied to call store write bus 6402 by buffer register BR and the location in which the word is to be written in the call store is applied to bus 6401 by index adder IA. A central pulse distributor CPD (not shown) is provided to communicate with peripheral units (not shown) and is addressed over buses 6403 and 6404. Communication with various network units is possible over bus 6406. Information from peripheral points in the system is returned to the processor over scanner answer (SA) bus 6600 and entered into the logic register LR.

The equipment shown on the left side of FIG. 1 is used to determine the action to be taken in accordance with the instructions read out of program store 102. Each instruction, in addition to Hamming and parity bits for error detection and correction may include, as shown also in FIG. 3, an operation field, a data-address field, and an index register identity. The three parts of each instruction, when shown hereinafter, are separated by commas. When a part of an instruction is to be omitted, an extra comma is used as a marker to that effect.

When program store 102 is read out, the operation field portion of a program order word is gated into the auxiliary buffer order word register ABOWR while the data-address field and the Hamming bits of the order word are directly gated into the buffer order word register BOWR. The auxiliary buffer order word register ABOWR is provided before the register BOWR to prevent an operation field being placed in the register BOWR before it has been cleared of the prior order word. The numbers 3, 7, 16 and 21 inside the buffer order word register indicate, respectively, the number of bits available to represent the 3 flag bits provided in accordance with the principles of the present invention, the 7 possible Hamming and parity bits, the 16 possible operation code and index register identifying bits, and the 21 data-address indicating bits. The data-address (DA) field is then transmitted to the index adder IA where indexing takes place if required. In the indexing step the DA field is modified by the addition to it of the word contained in one of the system registers, e.g., register XR. The sum derived by the index adder is the data or the address used in the execution of the order.

As multiple cycle overlap operation is possible in this system, an order word register OWR is provided in addition to the buffer order word register BOWR, together with their respective decoders OWD and BOWD; a mixed decoder MXD resolves conflicts between the program words in the two registers OWR and BOWR. The outputs of the decoders, together with selected clock signals from clock source CLK, are combined in the order combining gate circuit OCG which operates selected gates in the proper time sequences. The order combining gate circuit OCG thus generates the proper sequences of gating signals to carry out the indexing cycle and the execution cycle of each of the sequences of orders in turn as they appear first in the buffer order word register BOWR and then in the order word register OWR.

A memory address decoder MAD decodes the addresses from the index adder IA and controls the order combining gate circuit OCG to direct properly addressed equipment, e.g., the program store, call store, or registers.

The internal data processing structure is built around two multiconductor buses, the unmasked bus UB and the masked bus MB, and a link for moving a data word from one register to another. The mask and complement circuit M&C connects the unmasked bus to the masked bus and provides means for logically operating upon the data as it passes from the former to the latter. The logical operation to be performed, which may include among others, product mask (AND), union mask (OR), exclusive-OR mask (EXCLUSIVE-OR), and complementing, is prescribed by the operation field of the instruction word as decoded by either the buffer order word decoder BOWD or the order word decoder OWD.

Decision logic circuit DEC is provided to permit the executing of decision orders which either permit the processor to continue with the execution of the current sequence of orders or to transfer to a new sequence of orders. The decision order specifies that certain information is to be examined as the basis for the decision. The information is obtained from the control homogeneity circuit CH or the control sign circuit CS, or selected outputs of the K logic circuit KLOG. The basis of the decision may be that the information examined is arithmetic zero, less than zero, greater than zero, etc.

As mentioned above, a plurality of sequence circuits SEQ are provided, which circuits share control of the data processing with the various decoders. These circuits contain counter circuits, the states of which define the gating actions to be performed by the sequence circuits. The sequence circuits control the time of operation and execution of various of the orders.

Figure 5:
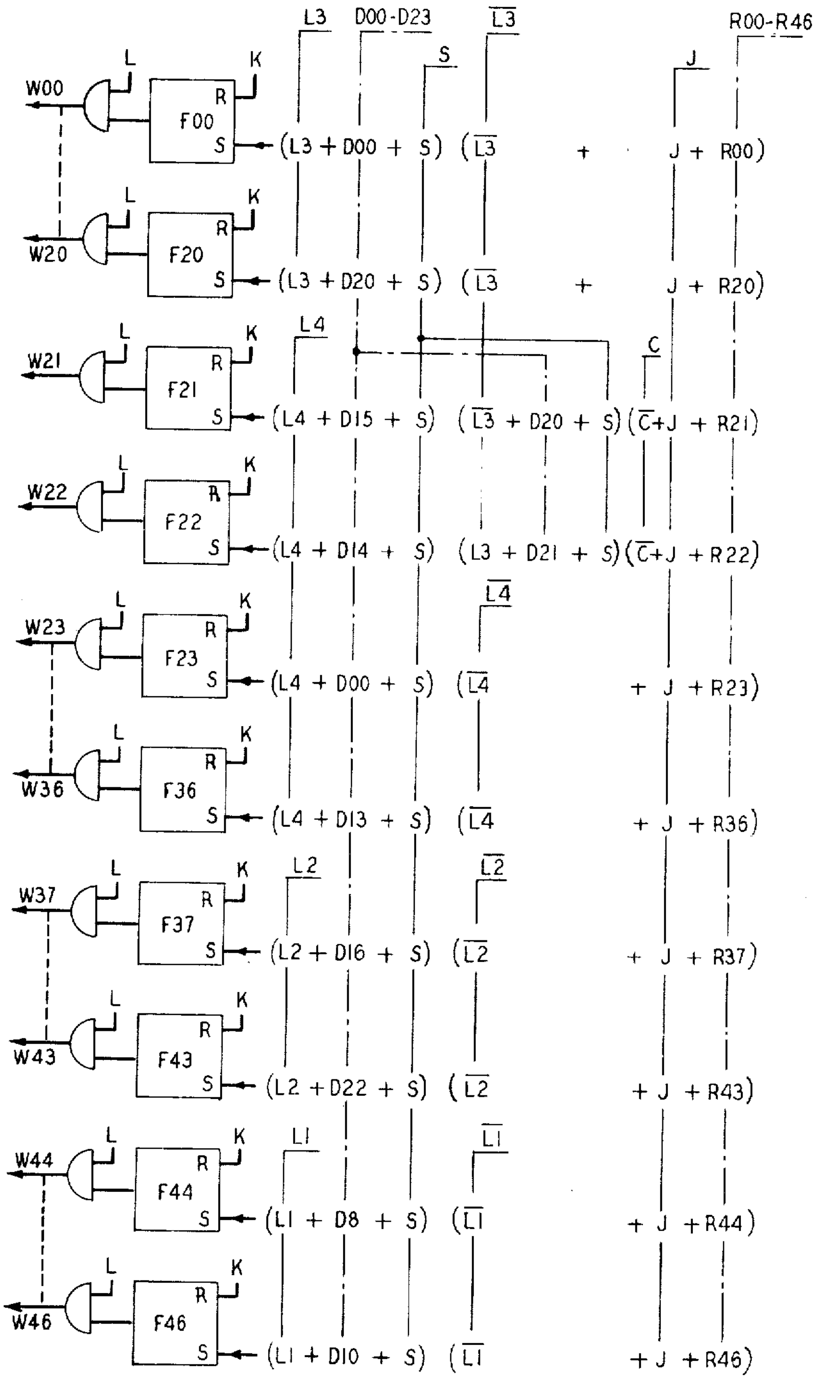
FIG. 5 shows the flip-flops for writing into the 47-bit program store word from the 23-bit data write bus.

In order to control the flag bits in accordance with the principles of my invention, it is desirable to have a program store least a portion of whose bits can be changed automatically by instructions from the central control. In the specific embodiment described here, the program store is an alterable memory unlike the program stores of the priorly referred to applications; of course, the programs derived in the herein described embodiments may be employed in the system of the Doblmaier et al. and Harr applications, which use a read-only program store. In this specific embodiment, however, the program store 102 is advantageously similar to the call store 103, but having a word of 47 information bits instead of one of 24 bits. The physical program store unit has a capacity for 131,072 words. To provide for altering the contents of the program store 102, the call store data writ bus 6402 is also connected to the program store. Two central pulse distributor controlled flip-flops (A1, A2, not shown) are provided in each program store to indicate which portion of the program store word should be altered by the contents of 24 bits of the call store data write bus. FIG. 5 shows the arrangement for writing into the 47-bit program store word from the 24-bit data write bus 402. Table I in the appendix relates the bits to be altered with the state of the A1, A2 flip-flops. Each entry represents the program store bit which is controlled by the corresponding call store data bus bit, when the A flip-flops are in the given state. In FIG. 5 the symbols employed have the following connotation: C is the write command pulse lead, S is the write data synch pulse lead, D00–D23 are the data write bus signal leads, R00–R46 are the output signal leads of the program store reading amplifiers, W00–W46 are the output leads of the program store write amplifiers. J is the read strobe signal lead, K is the flip-flop reset signal lead (which is activated prior to the occurrence of the read strobe signal on lead J), L is the write strobe signal lead and F00–F46 are the 47 flip-flops which retain a program store reading and which are employed to control a program store write operation. A bar written atop any of the foregoing quantities has the usual significance, i.e. the quantity is not "true." The signal leads L1–L4 are activated during the presence of the write command pulse on lead C in accordance with the states of the A1 and A2 flip-flops. Lead L1 is activated when both A1 and A2 are reset, lead L2 is activated when flip-flop A1 is set but flip-flop A2 is reset. Lead L3 is activated whenever flip-flop A2 is set and lead L4 is activated whenever flip-flop A2 is reset.

Normally, when a program store is read for data, if the address bit X20=1, the portion of the program store word indicated in the A1A2=10 column above are gated in central control as the desired data. A flip-flop B0 (not shown) is also added in the central control, in a buffer bus register. When this flip-flop is set, portions of the program store word indicated in the A1A2=00 column above are gated in central control as the desired data.

The programs to be described below are executed with flip-flops A1A2=00 in all program stores and flip-flop B=1 in the central control.

PROGRAM INSTRUCTIONS

Introduction

In the following description of program orders a symbolic instruction format is employed. The symbolic program order is divided into the following "fields" or columns:

LOCATION OPERATION CODE DA, RM, LCJ

The location field is used for assigning a symbolic address to an instruction which may then be referred to by other instructions in the program. The operation code field is used to specify the operation to be executed in this step of the instruction. The fields DA, RM and LCJ are the variable and option fields. The DA field is used to specify data or an address. The R subfield may be used to specify the buffer register BR, the X index register XR, the Y index register YR, the Z index register ZR, the K (accumulator) register KR, the F (first one) register FR, or the J (return address) register JR, all shown in FIG. 1. The M subfield is used only on transfer orders, conditional or unconditional, to indicate, by the appearance of the letter M after the first comma, that the transfer is indirect. The L subfield is used on certain orders to indicate one of the logical maskings employing the contents of the logic register LR, as set either by a previous instruction (PL or EL) or by the DA field of the present instruction (PS or ES). The appearance of the letter P in this subfield indicates the logic product ("and") function and specifies that each bit of the word on the way to its destination is matched with the corresponding bit of the logic register LR. When both are "1's," a "1" replaces the contents of that position of the word before it reaches its destination. When either is a "0," a "0" replaces the contents of that position of the word before it reaches its destination. The letter E is used to designate insertion masking. The CJ subfield, when used, may specify either "C" that the information on the unmasked bus is to be complemented en route to its destination, or "J" that the return address, i.e., the address following the conditional or unconditional transfer order, is to be placed in the return address register JR in the event a transfer does occur.

The illustrative program makes use of the following operation codes: MX (also MK, MY, MZ similar to MX except for the register involved); WK (also WY, WZ, WX similar to WK except for the register involved); CWK; TCAZ; KM (also ZM, XM similar to KM except for the register involved); AMK; T; AZR; CMK; and TCAU. Each of these codes will now be described and, when appropriate to a clearer understanding of the function, the entire instruction with all or part of the variable and option fields will be considered.

The instruction MX 10001 is an example of a memory-to-register instruction. While the index register XR is specified by the letter X in the example, any of the letters X, Y, Z, J, K, L, or B may be employed to specify the corresponding priorly mentioned registers of FIG. 1. The DA field of this instruction contains the octal word 10001 designating the address of a particular location in memory. The remaining subfields are blank. Had a register been specified in the RM subfield, the contents of the specified register added to the address 10001 would be the effective address of the memory location whose contents would be entered into the X register. In the instruction MX E.20, K the quantity E.20 in the DA field is a short form expression indicating that bit position 20 of the data address word is a "1" and all lower numbered bit positions are "0". This expression is employed in the illustrative program in connection with the order MX E.20, X. In this instruction, the contents of a memory location whose address is the current contents of the X register is modified by adding a "1" to bit position 20 thereof. Accordingly, the "left" half of the word whose address was in the X register replaces the contents of the X register.

An order which is related to the foregoing MX order is the register-to-memory order which is of the type KM KLφAD. Basically, this order instructs that the contents of the K register KR replace the contents of the B data buffer register BR. The new contents of the data buffer register then replaces the contents of the memory location whose address is symbolically indicated by KLφAD. A symbolic address is an address given in the location column.

Another closely related instruction is the order WK φ.7000000, X, PS. This is a word-to-register instruction and normaly causes the number indicated in octal in the DA field, modified by the contents of the index register specified in the RM field, to be inserted into the register indicated in the order. However, the presence of the expression PS in the LCJ subfield indicates that the contents of the DA field of the instruction is to be placed in the logic register LR before the new word is written into the K register KR so that the logic product ("and" function) may be computed with the contents of the X register. The resultant word is then entered into the K register KR.

The instruction CWK φ.1000000 indicates that, without changing the contents of the K accumulator register KR, the quantity in the DA field is to be subtracted therefrom and the C control flip-flops CH and CS set according to the homogeneity and sign of the resultant.

The instruction TCAZ UMφD is a transfer instruction which causes a transfer to the instruction whose address is symbolically specified as UMφD provided that the state of the C control flip-flops indicate arithmetic zero. A subsequent instruction labeled UMφD in the location field is the instruction intended.

The instruction TCAU is a transfer instruction similar to the instruction TCAZ except that the state of the C control flip-flops must indicate an arithmetic unzero for transfer to occur. Arithmetic unzero is defined as occurring when the state of the homogeneity flip-flop CH is zero regardless of the state of the sign flip-flop CS.

The instruction employing the operation code T is a basic instruction which orders that a transfer be made to the address indicated by the instruction. If the J option is specified, a return address is stored in the J register.

The instruction employing the operation code AMK orders that the contents of memory at the location given by the DA and RM subfields shall replace the contents of the data buffer register BR and, after possible product-masking and complementing specified in the LCJ subfields, be added algebraically to the contents of the K accumulator register KR. The sum obtained remains in the K register.

The instruction AZR , Y orders that the contents of the Z register ZR be algebraically added to the contents of the Y register YR indicated in the RM subfield. The sum sets the C control flip-flops CH and CS and replaces the contents of the Y register YR.

Illustrative, Program, Sequence

Having described the principal attributes of some basic operation codes and options used therewith, the illustrative program sequence employing them to actuate the apparatus and practice the method of the present invention may now be explained.

An instruction, which may have any of the flag bits in positions 44, 45, or 46 set (see FIGS. 1 and 3), is read out of program store 102 into the buffer order word register BOWR. The flag bits are recognized by flag bit decoder FBD and gated to register ABR–1 of buffer bus circuit 220, shown in additional detail in FIG. 2. Buffer bus register ABR–1 acts as the interrupt source register. The interrupt source register comprises a number of interrupt source flip-flops. In put signals to this register are presented by the millisecond clock and by various check circuits in known manner. In addition, the flag bit decoder circuit FBD presents any of the three flag bits from buffer order word register BOWR. Each of the interrupt sources capable of presenting a signal to register ABR–1 is assigned a priority level so that if two or more sources simultaneously request an interrupt of program processing, the source with the highest priority will take control. The interrupt level activity register ABR–2 serves to record the level interrupt corresponding to the program sequence being executed. Whenever the interrupt circuitry responds to an interrupt request, a corresponding flip-flop in the interrupt level activity register ABR–2 is set and the setting of this flip-flop screws to inhibit the interrupt circuitry from being activated by interrupt requests from the level just served and all lower levels. When an interrupt source signal is presented and sets its corresponding activity level flip-flops, the interrupt source register presents the signal to interrupt request logic 223 which, in turn, enables the interrupt request output conductor 224. The enabling of the interrupt request conductor together with clock signals and signals from sequencers SEQ and decoders DEC, FIG. 1, initiate the interrupt sequence. The interconnection with sequencers SEQ and decoders DEC assures that the interrupt request will allow any multicycle order, etc., to go to completion before generating the wired transfer of program control. The actual transfer is determined by the activation of the output leads of the interrupt sequencer 4901, FIG. 2. Once activated, the interrupt sequencer 4901 carries out a number of functions extending over a period of several machine cycles. Accordingly, an output of the interrupt sequencer 4901 is provided to inhibit the outputs of the decoder DEC and buffer order word decoder BOWD. The interrupt sequencer in known manner is wired (not shown) to generate independent gating signals to carry out a sequence of operations which include (1) updating the interrupt level activity register ABR–2, (2) generating the transfer address of the entry point of the interrupt program sequence corresponding to the class and type of interrupt being served, (3) gating the entry point address to the program address register PAR, FIG. 1, (4) storing the contents of the data buffer register BR (FIG. 1) in a location in call store 103 which location is reserved for the class and type of interrupt being served, (5) storing, in the case of conventional interrupt, the address of the instruction immediately following the last instruction executed prior to the interrupt. In similar fashion to the foregoing, the interrupt sequencer is also wired (not shown) to provide a gating signal for (6) storing, in the case of an interrupt generated by flag bit decoder FBD, the address of the instruction which generates the interrupt. This address is stored in a call store 103 location reserved for the type of interrupt determined by the 3-bit flag pattern detected by decoder FBD. For the sake of convenience it will be assumed in the ensuing description that this reserved call store location has the octal address 10001.

SEAMφD—To classify the instruction generating the interrupt

The first instruction in the illustrative program is:

SEAMφD MX 10001

The word SEAMφD is the symbolic location of the first instruction. It is a notation made for the use of the programmer for convenience in indicating the starting point of the sequence of orders. The use of symbolic language in the location field of an instruction is well known in the art and its ramifications need not be extensively explored herein. The rationale of this first instruction is to take the contents of memory location at the octal address 10001 and enter it into the X index register XR. The wired interrupt sequence, priorly described, will have placed in memory location 10001 the address of the flagged instruction which caused the interrupt. As mentioned above in the description of the wired interrupt sequence, the second step (2) thereof is an instruction to transfer to the entry point of a sequence of program instructions determined by the flag bit pattern detected by decoder FBD. The symbolic address of this entry point is the location SEAMϕD. When the instruction at this entry point is executed, the X index register will have transferred to it from call store location 10001 the address of the flagged instruction which generated the interrupt.

The next instruction in the illustrative program is:

MX E.20, X

Figure 3:
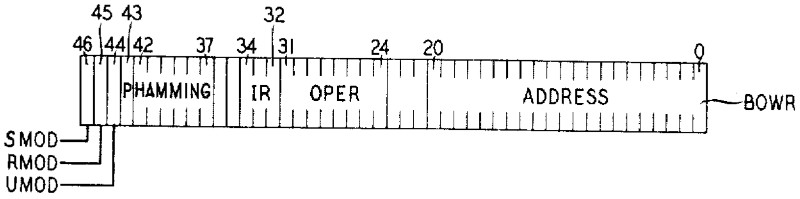
FIG. 3 shows the buffer order word register having the flag bit cells provided in accordance with the principles of the invention.

This instruction replaces the contents of the X index register with the left part of the interrupted order itself. Referring to FIG. 3, which shows the buffer order word register BOWR, it is there seen that the left part of an instruction would include the flag bits UMϕD, RMϕD, and SMϕD. The corresponding bit positions 46, 45, and 44 of the instruction of the flagged instruction which generated the interrupt would then be examined to determine subsequent steps of the illustrative program, as the following sequence of compare and transfer instructions indicates.

The next instruction in the illustrative program sequence is:

WK ϕ.7000000, X, PS

This word to register instruction product masks the contents of the X index register with the octal quantity written in the DA subfield. This operation places the three left-most bits, i.e., the flag bits of the instructions which generated interrupt, into the K register.

The next instruction in the illustrative program sequence is:

CWK ϕ.1000000

This instruction without changing the contents of the K register subtracts the quantity in the DA subfield from the contents of the K register and sets the C control flip-flops CH and CS according to the homogeneity and sign of the resultant. The particular result of this subtraction is to set the C flip-flops if flag bit 44, indicating the presence of a UMϕD flag bit, is set.

The next instruction in the illustrative program is:

TCAZ UMϕD

This instruction causes a transfer to the symbolic location UMϕD (infra in the program sequence) if the C flip-flops were set. If flag bit 44 was not detected in this instruction, no transfer is made and the program address register, PAR, FIG. 1, is incremented normally to the next instruction which is

CWK ϕ.2000000

This instruction similarly tests for the presence of the RMϕD flag bit in bit position 45 and sets the C flip-flops if the flag bit is detected. The next instruction is:

TCAZ RMϕD

This instruction causes a transfer to the symbolic location RMϕD, infra in the program sequence, if the C flip-flops have been set. If the C flip-flops have not been set, the program register address is incremented normally and the next instruction is:

CWK ϕ.4000000

This instruction tests whether the SMϕD flag bit is set in bit position 46 of the program order word which generated the interrupt. If bit 46 is present, the C flip-flops are set. The next instruction in the program sequence is:

TCAZ SMϕD

This instruction causes a transfer to the symbolic location SMϕD, infra in the program sequence, if the C flip-flops have been set. If the C flip-flops have not been set, the program address register PAR, FIG. 1, is incremented normally and the next step is:

T CMϕD

This instruction is an unconditional transfer order to the symbolic location CMϕD, infra in the program sequence. The rationale of the steps so far taken is to examine the flag bits of the instruction which generated the interrupt and then to branch to a particular portion of the illustrative program sequence in accordance with the type of flag bit detected.

The last instruction, i.e., T CMϕD is reached only where an interrupt is generated but apparently none of the flag bits of a program order word has caused the interrupt. The subroutine commencing with the instruction written at symbolic location CMϕD then tests for the presence of a special configuration word in buffer register BR, as will be hereinafter more fully described.

UMϕD—To detect an unnecessary register load instruction

The test performed upon the confirmation of the presence of a UMϕD flag bit is indicated hereafter. The UMϕD program would first have to analyze which register was being modified by the interrupted program instruction. This would be accomplished by checking the operation code of that instruction, currently in the X register. For the illustrative example, consider the most complex case, i.e., that the register which was modified was the K register. The subsequent instructions of this program sequence are as follows:

MK 10001

This instruction places the address of the instruction which generated the interrupt into the K register.

The next instruction is:

KM KLϕAD

This instruction transfers the contents of the K register to the memory location symbolically indicated by the term KLϕAD. Accordingly, memory location KLϕAD now contains the address of the instruction which generated the interrupt.

The object of the next four steps is to determine whether the K register was the one which was set up by the interrupted program step.

The instruction:

WL ϕ.770 sets up the logic register so that it will mask out all bits except the six which are in the positions 8–3. For reading the instruction portion or left half of a word from the program store, bits 31–26 are passed and all other bits are masked out.

The instruction:

MK E.20, K, PL will cause the left half of the instruction which was interrupted to be read and passed to the accumulator; all except bits 31–26 will be masked out.

The instruction:

CWK ϕ.150 will cause the constant represented by the octal quantity 150 to be compared with the quantity in the accumulator. The object of this instruction is to test for an MK instruction.

The instruction:

TCAU NϕTK will cause a program transfer to another program, NϕTK if the result of the previous comparison indicated that the instruction whose execution was interrupted was not an MK instruction. The NϕTK program will be similar to the program described below, but instead of concentrating on accumulator altering, or using instructions, it will concentrate on instructions which alter or use the other register that the interrupt program instruction was setting up.

The next instruction is:

WY 1

This instruction replaces the contents of the Y index register with the count of 1. The Y index register, as will be hereinafter described, in this subroutine will be employed as a counter.

The next instruction in the illustrative sequence is:

WZ 1

This instruction similarly is for the purpose of initializing the Z index register for a counting function.

The next instruction is:

ANϕT AWK ,Y

This instruction orders that the contents of the Y index register shall be added algebraically to the contents of the K accumulator register. Accordingly, when this instruction has been executed, the K register contains the address of the instruction which would normally follow in the program the execution of the instruction which generated the interrupt. It should be appreciated, however, that the program ceased to be followed once the flagged instruction was detected. The instruction of the instant subroutine at location ANϕT then serves the purpose of "interrogating" the program which was interrupted as the first step in determining the nature of some of the subsequent instructions therein without, of course, allowing any of these instructions to be executed at this point.

The next instruction in the instant subroutine is:

MX E.20, K

This instruction places the left half of the program order word read from memory at the address given by the K register into the X register.

The next instruction:

CHEKB WK ϕ.7000, X, PS

This word to register instruction places bits 32 through 34 into the K register. The K register now contains the bits which could be used for indexing in the program instruction following the instruction which generated the interrupt. Reference to FIG. 3 shows that bits 32 through 34 of the buffer order word register BOWR are labeled "IR."

The next instruction is:

CWK ϕ.1000

This instruction, without changing the contents of the K register, subtracts therefrom the octal quantity 1000 and sets the C control flip-flops CH and CS according to the homogeneity and sign of the resultant. In accordance with BCHEK list, infra Appendix Table III, the octal code employed to indicate the use of the B register as an index register is ϕ.1000.

The next instruction is:

TCAZ SEQ

This instruction causes a transfer to the entry point at the subroutine commencing at symbolic location SEQ provided that the state of the C conttrol flip-flops indicate arithmetic zero. This will, in fact, be the case if the instruction put into the K register by the order at symbolic location CHEKB had bits directing the use of the B register for indexing. If the state of the C control flip-flops is not arithmetic zero, the next instruction executed is:

WK appropriate mask, X, PS

The legend "appropriate mask" in the DA subfield refers to the list of masks given in BCHEK list, infra Appendix. This instruction and the next two instructions are repeated for each of the items BCHEK list, infra Appendix. They are also repeated for each item in KCHEK list, infra Appendix Table II. Programming instructions necessary to sequentially remove items from a list and insert them one at a time into an instruction are known, and the inconclusion of the detailed steps therefore would unduly complicate the presentation. Accordingly, I have omitted the detailed instructions for inserting the octal coding of the first mask, which BCHEK list is presumed to be stored in a convenient location in memory. The instruction WK appropriate mask, X, PS places into the K register the bits of the instruction to be tested for the presence of any of the orders indicated in the instruction column of the BCHEK list.

The next instruction is:

CWK (appropriate octal code of instruction in BCHEK list)

This instruction tests whether the octal code indicated in the BCHEK list has been placed into the K register by the preceding instruction.

The next instruction is:

TCAZ SEQ

This instruction causes the transfer to the subroutine whose entry point is at symbolic location SEQ.

In accordance with well-known methods of table look up, not necessary to be herein described, each of the instructions WK appropriate mask, X, PS;
CWK appropriate octal code; and
TCAZ SEQ is executed for each of the items in the BCHEK list and then for each of the items of the KCHEK list.

If both lists have gone through without a transfer to symbolic location SEQ, the next instruction executed is:

WK ϕ.770, X, PS

This instruction inserts in the K register those bits of the instruction whose address is given in the X register that could be used by that instruction to overwrite the information sought to be written in a register by the instruction which generated the interrupt. This instruction, therefore, makes available in the K register the bits that would indicate a second register load from memory instruction.

The next instruction is:

CWK ϕ.150

This instruction, without changing the contents of the K register, subtracts therefrom the octal quantity 150. 150 is the octal code which designates the presence of a memory-to-accumulator instruction in this specific embodiment.

The next instruction is:

TCAZ USLS

This instruction causes a transfer to the routine indicated at the symbolic location USLS in the event that a memory-to-accumulator instruction was detected. Routine USLS retains the flag bit in the instruction which generated the interrupt. If no such instruction was detected, the next instruction is:

MK 10001

This instruction places the address of the instruction which generated the interrupt into the K register. The next instruction is:

AZR ,Y

This instruction updates the contents of the Y register by replacing it with the contents of the Z register. The Y register now contains the address of the next instruction in the program being tested. With this information in the Y register, transfer is made to the entry point ANφT, above. by the following instruction:

T ANφT

At this point the UMφD sequence has been "completed" and the flagged instruction generating the UMφD interrupt has either had its flag unset, indicating that the instruction is "useful," or left intact in which case (routine USLS having been executed) the flagged instruction is not executed when return is made to the program which was interrupted.

RMφD—To determine if a register already contains certain information

The entry point RMφD is the location of a subroutine whose purpose it is to examine a flagged instruction detected by the flag bit decoder FBD. The first instruction in this subroutine is:

RMφD MX 10001

It will be recalled that the initiation of interrupt places the address of the flagged instruction which generated the interrupt into an especially reserved area of call store memory 103. For the sake of convenience, this area is assigned the address 10001. Accordingly, the execution of this instruction places the address of the instruction which generated the interrupt into the X register. The next instruction is:

MY φ.7777777, X, PS

This memory-to-register instruction places into the Y index register the address field (bits 0 through 20 of the buffer order word register BOWR, FIG. 3) of the flagged instruction which generated the interrupt. The DA field of the instant instruction is product masked against the contents of the X register. It will be recalled from the above that in this format of product masking the contents of the corresponding bit positions of the index register specified in the RM subfield are entered into the register specified in the operation code whenever the corresponding bit position of the word in the DA field is a "one." The DA field contains 21 such "one's," the word φ.7777777 being the octal equivalent thereof, as is well known. The next instruction is:

MK KSAVE

This memory-to-register instruction places the contents of the memory location having the symbolic address KSAVE into the K register. It will be recalled that upon initiation of interrupt the contents of the buffer and other registers are stored away in memory so that the system may continue with program processing after the completion of the work dictated by the interrupt sequence. In this storing away process the contents of the K register are stored in memory at a location which may conveniently be given the symbolic address KSAVE. Accordingly, the execution of the next instruction returns to the K register whatever was contained therein immediately prior to the inception of the interrupt. The next instruction is:

CMK ,Y

In this instruction the contents of memory at the location indicated by the contents of the Y index register are subtracted from the contents of the K register without changing the K register and the resultant sets the C control flip-flops in accordance with the homogeneity and sign of the resultant. This procedure has the effect of comparing the information that was in the K register before interrupt with the information that would be ordered to be entered therein by the flagged instruction which generated the interrupt. If the information is the same it would appear that the flagged instruction is redundant, as the remainder of this program determines. The next instruction is:

TCAU SEQ1

This instruction calls for transfer based on the state of the C control flip-flops to the entry point of the program assigned the symbolic location SEQ1 provided that the contents of the K register before interrupt are not the same as the information sought to be entered therein by the flagged instruction. If, however, the information is the same in each case, the next instruction executed is:

WY 1

This instruction functions as a counter for obtaining the next instruction in the checking B routine. The next instruction is:

ANN AMK 10001, Y

This instruction orders that the address of the instruction following the one which generated the interrupt be algebraically added to the register. It will be recalled that the address of the instruction which generated the interrupt had been stored at location 10001. The next instruction is:

MX E.20, K

This instruction inserts the left part of the instruction following the interrupt instruction into the X register. The K register had the address of this instruction and the operator E.20 masks the right part of the information contained in memory so that the left part may be entered into the X register. The next three instructions are:

WK Appropriate Mask, X, PS
CWK (Appropriate octal code)
TCAZ SEQ

The above three instructions are executed for each item in the BCHEK list, infra, Appendix. The next instruction is:

WK φ.600, X, PS

This instruction inserts into the K register those bits of the instruction which could be utilized to designate a second register load from memory. The next instruction is:

CWK φ.200

This instruction tests whether the octal code is in fact present. The next instruction is:

TCAZ USLS2

This transfer instruction causes the transfer to the program sequence whose entry point is designated with the symbolic location USLS2. The transfer is made provided that the state of the C control flip-flops indicates arithmetic zero. If the C control flip-flops do not so indicate, the next instruction is:

AZR ,Y

The operation code AZR orders that the contents of the Z register be algebraically added to the contents of the Y register indicated in the RM subfield. The execution of this instruction updates the contents of the Y index register to provide therein the address of the next instruction. After this instruction is executed, the next instruction is:

T ANN

This instruction causes a transfer to the symbolic location ANN, supra. Execution of the sequence whose entry point is ANN then tests the next instruction in the program which was interrupted. This instruction of the program is then tested to see whether it is listed in the BCHEK list and whether it is a memory instruction. At this point the instruction at the symbolic location USLS2 will be given

USLS2 MX 10001

This memory-to-register instruction places into the X index register the contents of memory at location 10001 which contents is the address of the flagged instruction that caused the interrupt. The next instruction is:

T USLS1

This instruction when executed is an unconditional transfer to the program sequence whose entry point is the symbolic location USLS1. The instructions at this location: appear infra.

SMφD—Writes special configuration word on memory store instructions

The third type of flagged instruction detectable by flag bit decoder FBD is the one having a flag in bit position 44 indicating that the program sequence at symbolic location SMφD shall be executed. The first instruction in this routine is:

SMφD MX 10001

This memory-to-register instruction places into the X register the address of the flagged instruction which caused the interrupt. The address of this instruction was placed into the call store memory at location 10001 incident to the initiation of interrupt. After this instruction is executed, the next instruction is:

MY φ.7777777, X, PS

Since the X register contains the address of the interrupt instruction, the interrupt instruction itself will be obtained from memory, its left half will be blanked by the octal word 7777777, and therefore its right half, i.e., its address field, will be loaded into the Y register. The next instruction is:

WZ φ.7777777

This instruction merely loads the Z register with the special configuration word 7777777. The next instruction is:

ZM ,Y

This register-to-memory instruction loads the special configuration word into the memory location specified in the address field of the flagged instruction which generated the interrupt. The next instruction is:

MK KSAVE

This memory-to-register instruction replaces into the K register whatever this register contained prior to the initiation of interrupt, the information having been saved at the symbolic location KSAVE incident to the initiation of interrupt. The next instruction is:

KM SPECS, Y

This instruction takes the contents of the K register and places it into a special scratch location in an area which contains a complete image of the call store; the address of this scratch location is given by the sum of the quantities in the DA and RM subfields, i.e., SPECS and the contents of the Y index register. Thus, the special scratch location is loaded with the quantity which was intended for the location at the address given in the flagged instruction which generated the interrupt. The next instruction is:

XM SPECA, Y

This instruction stores in a scratch memory (located in another area which contains a complete image of the call store) the address of the flagged instruction which generated the interrupt. Accordingly, at this point it is seen that the quantity which was intended by the flagged instruction to be stored in a particular location in memory is not stored at that location but is stored at a location displaced from that location by a predetermined amount, which amount is given by the symbolic quantity SPECS. In addition, the address of the flagged instruction itself has been stored in the scratch location SPECA.

Figure 4:
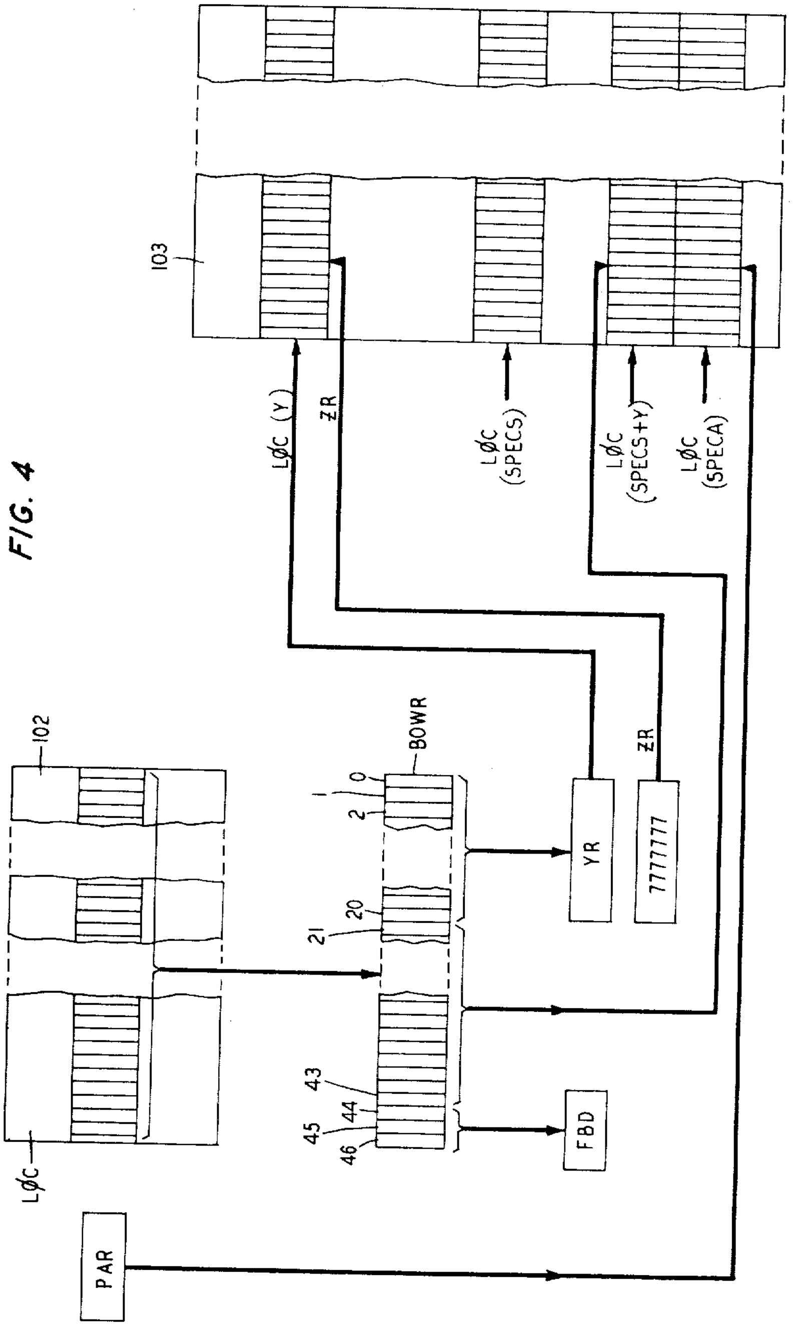
FIG. 4 shows the arrangement of certain information transfer paths during the operation of the invention.

FIG. 4 shows the arrangement which has been effected incident to the execution of the sequence of instructions just described beginning at entry point SMφD. The program address register PAR is furnished with the address of an instruction in program store 102. The bits of the instruction are entered into buffer order word register BOWR. Flag bits 44, 45, and 46 have selectively activated flag bit decoder FBD generating an interrupt as described above. During interrupt, the contents of address bits 0 through 20 are entered into the Y register YR. The address bits 0 through 20 of the flagged instruction in the buffer order word register would normally have been interpreted by order word decoder OWD as a location in call store 103 in which the contents of bits 21 through 43, or some portion of them, would be written. (This "normal" interpretation is presumed because the flag bits are assumed to be present on previously unexamined register load or memory order instruction. The instant instruction is presumed to be a memory load instruction.) However, during interrupt, the flagged instruction is not written in the normal location in call store memory 103. Instead, the special configuration (octal) word 7777777 is entered into the Z register ZR and the contents of the Z register is written at the location specified in the flagged instruction. This location has for convenience priorly been entered into the Y register YR and the contents of the Y register is now employed to designate this address to call store 103. A special scratch pad area is reserved in call store 103 large enough to contain a complete image of the normally used call store areas. The address of this scratch area is given the symbolic location SPECS. Since the scratch pad may in the course of examining program instructions be employed several times for different instructions, an area in the scratch pad is designated with the aid of the contents of the Y register. The location SPECS in the scratch pad is designated to receive the contents of bits 21 through 43 of the flagged instruction. It will be seen that this information is stored in call store 103 in the scratch pad location which is displaced by the equivalent of the symbolic address SPECS from the location in which it would normally have been stored. The address of the flagged instruction itself is taken from the program address register and entered into scratch location SPECA.

With the information stored in the foregoing manner, the stage is set for the CMφD program, hereafter described, to detect the readout of the special configuration word 7777777 from call store 103. Routine CMφD will then replace the special configuration word with the information that the flagged instruction was prevented from inserting in that location and the flagged instruction itself will be "unflagged."

Returning now to the instructions of the SMφD sequence, the next instruction is:

T USLS1

This unconditional transfer instruction causes a transfer to the program sequence whose entry point is given by the symbolic location USLS1 which, in turn, when executed leaves the flag bit of the flagged instruction untouched and causes return to the instruction following that of the flagged instruction which caused the interrupt.

The instructions given at the symbolic locations USLS and USLS1 are as follows:

USLS MX KLφAD

This memory-to-register instruction loads the X register with the address of the flagged instruction which caused the interrupt. The next two instructions are:

USLS1 WX 1, X

XM 10001

This sequence of two instructions adds 1 to the contents of memory at location 10001 so that this location now contains the address of the flagged instruction plus one. The next instruction is:

T ALP

This unconditional transfer instruction is to a conventional program whose entry point is given at the symbolic location ALP. This conventional program (not herein listed) is the program conventionally executed incident to the conclusion of interrupt to restore to the registers the contents which they had just prior to the initiation of interrupt. The flagged instruction which generated the interrupt is not, however, executed, the return being made to the instruction following the flagged instruction. Accordingly, the flagged instruction will have been omitted.

Figure 2:
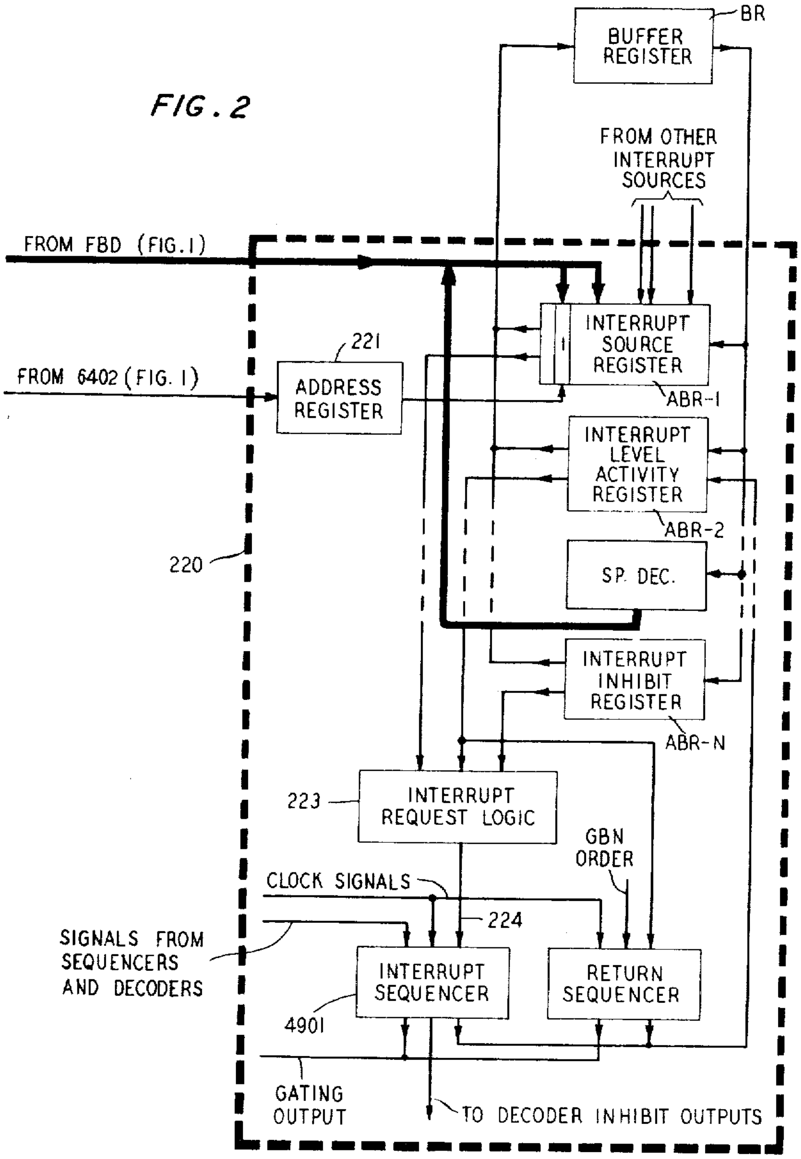
FIG. 2 shows additional details of the apparatus for generating program interrupt and for resetting flag bits of instruction found to be useful.

CMϕD—Removes flags and rewrites memory word when special configuration word is read out by program The subroutines executed upon the detection of flags in any of bit positions 46, 45, or 44, i.e., subroutines UMϕD, RMϕD, and SMϕD, have just been described. In addition, there is a subroutine which is executed whenever the special configuration word 7777777 stored in memory by the SMϕD subroutine is detected in the buffer register BR. This detection is made by special decoder SPDEC (FIG. 2). The output of this decoder is coupled to interrupt source register ABR–1 to initiate interrupt. Upon the initiation of interrupt, the address of the instruction which generated the interrupt is stored in memory. For convenience, the memory location 10001 may be used for this purpose. The contents of the other registers in the system is stored away in memory in the conventional manner. The first instruction of the routine designated by this interrupt is given at the symbolic location CMϕD, thus:

CMϕD MX 10001

This instruction places into the X register the address of the instruction which caused special decoder SPDEC to be activated. The next instruction is:

MY ϕ.7777777, X, PS

This instruction places into the Y register the address field of the instruction which generated the interrupt. The next instruction is:

MX SPECA, Y

This instruction places into the X register the address of the flagged instruction which caused the special configuration word to be stored in memory. Since the read-out from memory of this special configuration word has itself just caused an interrupt to occur, it is clear that the original instruction caused memory to be loaded with information found to be needed later on in the program. The next instruction is:

MZ E.20, X

This instruction places into the Z register the left half of the instruction which initially caused the special configuration word to be stored in memory. The next instruction is:

WK ϕ.777777, Z, PS

This instruction makes bits 44, 45, and 46 of the instruction which caused the special configuration word to be loaded into memory to be unset, i.e., made zero. The next instruction is:

KM E.20, X

This instruction causes the instruction with the unset flag bits to be returned to program store and its original address therein. It will be recalled that register-to-memory instructions are capable of writing information into either program store 102 or call store 103 with equal facility.

For convenience, program sequence instructions are conventionally written into program store 102. The next instruction is:

MZ KSAVE

This instruction places into the Z register the quantity which should have been loaded when the special configuration word was loaded, the quantity having been stored in memory at the symbolic location KSAVE. The next instruction is:

ZM ,Y

This instruction causes the quantity which should have been loaded to be entered in memory at its correct location which is given by the contents of the Y index register. The next instruction is:

T ALP

This unconditional transfer instruction to the program sequence whose entry point is the symbolic location ALP has been priorly referred to. The conventional program sequence written at location ALP (not herein listed) restores the registers and causes return to the instruction which caused the interrupt. This instruction is unflagged and is therefore executed.

SEQ1—To write into writable program store 102

The instructions at symbolic locations SEQ1 and SEQ may now be listed although they would be performed only in accordance with a transfer from a prior instruction; thus:

SEQ1 MX E.20, X

This instruction causes the X register to be loaded with the left part of the instruction which caused the interrupt. The next instruction is:

SEQ WK ϕ.777777, X, PS

This instruction makes bits 44, 45, and 46 zero. The next instruction is:

KM E.20+10001

This instruction causes the instruction with the unset bits to be reloaded into the program store. This program store write instruction (K register to "memory") advantageously makes use of the simple expedient of having locations in the writeable program store 102 identified by higher number addresses than locations in call store 103. Left half write orders are distinguished from right half write orders by the specification of E.20 along with the normal call store write data. The addressing of the program store in this manner is detected by address register 221 (FIG. 2) which unsets the priorly set flip-flops of interrupt source register ABR–2. The next instruction is:

T ALP

This instruction causes a transfer to the conventional program (not listed herein) which restores the registers and causes a return to the instruction which caused the interrupt. Since this instruction has been unflagged, it is executed by the program.

With the foregoing description of the illustrative program for activating the apparatus and practicing the method of the present invention in mind, the function of the apparatus of FIG. 2 may now conveniently be summarized. Interrupt source register ABR–1 has been adapted to receive interrupt signals from the flag bit decoder FBD of FIG. 1 as well as from the other conventional interrupt sources. The interrupt source register flip-flop triggered by the flag bit decoder is reset selectively under control of the afore-described illustrative program. Thus, when an interrupt triggered by a flagged instruction has been determined to be useful, the data required to rewrite the instruction with unflagged bits in bit positions 44, 45, and 46 is transmitted over bus 6402. The appearance of this order on bus 6402 is detected in address register 221 which resets the interrupt source register flip-flop.

It is to be understood that the above-described arrangements are illustrative of the application of the principles of the invention. Numerous other arrangements may be devised by those skilled in the art without departing from the spirit and scope of the invention.

APPENDIX TABLE I

| Call Store Data Write Bus 6402 Bit Proposition | Corresponding Bit in Program Store Word | | | |
|---|---|---|---|---|
| | A1A2=00 | A1A2=01 | A1A2=10 | A1A2=11 |
| 0 | 23 | 0 | 23 | 0 |
| 1 | 24 | 1 | 24 | 1 |
| 2 | 25 | 2 | 25 | 2 |
| 3 | 26 | 3 | 26 | 3 |
| 4 | 27 | 4 | 27 | 4 |
| 5 | 28 | 5 | 28 | 5 |
| 6 | 29 | 6 | 29 | 6 |
| 7 | 30 | 7 | 30 | 7 |
| 8 | 31 | 8 | 31 | 8 |
| 9 | 32 | 9 | 32 | 9 |
| 10 | 33 | 10 | 33 | 10 |
| 11 | 34 | 11 | 34 | 11 |
| 12 | 35 | 12 | 35 | 12 |
| 13 | 36 | 13 | 36 | 13 |
| 14 | 22 | 14 | 22 | 14 |
| 15 | 21 | 15 | 21 | 15 |
| 16 | | 16 | 37 | 16 |
| 17 | | 17 | 38 | 17 |
| 18 | 44 | 18 | 39 | 18 |
| 19 | 45 | 19 | 40 | 19 |
| 20 | 46 | 20 | 41 | 20 |
| 21 | | 21 | 42 | 21 |
| 22 | | 22 | 43 | 22 |
| 23 | | | | |

APPENDIX TABLE II

[List of instructions using K register]

| Instruction | PS masking | | Encoding (octal) |
|---|---|---|---|
| K as index register | φ.7000 | bits 34-32 | φ.4000 |
| KM | φ.770 | bits 31-26 | φ.110 |
| KN | φ.770 | bits 31-26 | φ.150 |
| KH | φ.770 | bits 31-26 | φ.510 |
| AKR | φ.776 | bits 31-24 | φ.530 |
| SKR | φ.776 | bits 31-24 | φ.530 |
| AMK | φ.776 | bits 31-24 | φ.752 |
| AWK | φ.770 | bits 31-26 | φ.750 |
| SWK | φ.770 | bits 31-26 | φ.750 |
| CWK | φ.770 | bits 31-26 | φ.740 |
| CWKU | φ.770 | bits 31-26 | φ.740 |
| PWK | φ.770 | bits 31-26 | φ.640 |
| PMK | φ.776 | bits 31-24 | φ.242 |
| CMK | φ.776 | bits 31-24 | φ.342 |
| CMKU | φ 776 | bits 31-24 | φ.340 |

APPENDIX TABLE III

[List of instructions using B register]

| Instruction | PS masking | | Encoding (octal) |
|---|---|---|---|
| B as index register | φ.7000 | bits 34-32 | φ.1000 |
| T | φ.774 | bits 31-25 | φ.010 |
| BM | φ.776 | bits 31-24 | φ.102 |
| BG | φ.776 | bits 31-24 | φ.402 |
| BH | φ.776 | bits 31-24 | φ.502 |
| BN | φ.776 | bits 31-24 | φ.142 |
| ABR | φ.776 | bits 31-24 | φ.522 |
| SBR | φ.776 | bits 31-24 | φ.522 |

What is claimed is:

1. A program testing system comprising decoder means for determining from the flag bits of an instruction about to be executed whether the instruction is a register load order of a memory storing instruction; interrupt means controlled by said decoder means for inhibiting the execution of said instruction and for transferring to a stored sequence of instructions in accordance with said determined flag bit; *first* means operative when the flagged instruction is a register load instruction for examining the coded portions of instructions which would normally follow the flagged instruction in the absence of the operation of said interrupt means to determine if any thereof contain codes calling for the utilization of the information sought to be inserted in the register specified by the register load instruction; *second* means operative when the flagged instruction is a register load instruction for determining if the information sought to be inserted in the register specified by the register load instruction is already in said register; *third* means operative when said instruction is a memory storing instruction for temporarily storing in an alternate location the information sought to be stored in the memory location specified in said memory storing instruction; *fourth* means operative responsive to an instruction calling for the readout of information from said memory location specified in said memory storing location for transferring said information from said alternate location to said specified memory location; and *fifth* means operative to restore said interrupt means and remove one of said flag bits responsive to any of: said first means detecting one of said codes, said second means determining said information not already to be present in said register or said fourth means operating in the presence of said instruction calling for said information readout from said specified memory location.

2. A program testing system according to claim 1 further comprising *sixth* means operative to leave said flags undisturbed and to skip execution of said flagged instruction responsive to any of: said first means failing to detect any of said codes, said second means determining said information already to be present in said register, or said third means operating.

3. A stored program data processing machine comprising a memory unit for storing data and instructions to be processed, register means for receiving instructions from addressable locations in said memory unit, means coupled to said register for detecting the presence therein of a selectively removable flag bit when a data storing instruction is received by said register, said data storing instruction normally indicating an address in said memory unit at which said data is to be stored, first means responsive to said detecting means for temporarily preventing storage of said data at said normally indicated address, second means responsive to said detecting means for storing a special configuration word in said memory unit at said normally indicated address, third means responsive to said detecting means for storing said data indicated by said instruction in said register at a first temporary storage location in said memory unit, said temporary storage location being offset by a predetermined amount from said normally indicated address, fourth means responsive to said detecting means for storing at a second temporary storage location in said memory unit the address from which said memory storing instruction in said register was obtained, said second temporary storage location being offset by a predetermined amount from said first temporary storage location, second detecting means for detecting the readout of said special configuration word from said memory unit, means responsive to said second detecting means for reading out said data and said instruction address from said first and second temporary storage locations, and means for removing said flag bit from said instruction indicated by said address readout of said second temporary storage location.

4. A data processing system according to claim 3 further comprising means for rewriting said data read out of said first temporary storage location into said memory unit at said location from which said special configuration word was read out.

References Cited

UNITED STATES PATENTS

| | | | |
|---|---|---|---|
| 3,350,690 | 10/1967 | Rice | 340—172.5 |
| 3,213,427 | 10/1965 | Schmitt et al. | 340—172.5 |
| 3,080,548 | 3/1963 | Hagen et al. | 340—172.5 |

GARETH D. SHAW, Primary Examiner